United States Patent
Leblanc

(10) Patent No.: US 7,013,518 B2
(45) Date of Patent: Mar. 21, 2006

(54) COLLAPSIBLE LOADING RAMP

(76) Inventor: Kim Andrew Leblanc, P.O. Box 1194, Pincher Creek AB (CA) T0K 1W0

( * ) Notice: Subject to any disclaimer, the term of this patent is extended or adjusted under 35 U.S.C. 154(b) by 0 days.

(21) Appl. No.: 10/619,418

(22) Filed: Jul. 16, 2003

(65) Prior Publication Data
US 2004/0083562 A1 May 6, 2004

(51) Int. Cl.
E01D 1/00 (2006.01)

(52) U.S. Cl. ........................ 14/69.5; 182/156

(58) Field of Classification Search ................. 14/69.5, 14/71.1; 182/20–22, 152, 156, 159, 160, 182/163, 164
See application file for complete search history.

(56) References Cited

U.S. PATENT DOCUMENTS

| | | | |
|---|---|---|---|
| 3,042,143 A * | 7/1962 | Silen ........................ 182/163 |
| 3,081,840 A * | 3/1963 | Hire ........................ 182/163 |
| 3,286,789 A * | 11/1966 | Planchon .................... 182/163 |
| 3,713,553 A | 1/1973 | Curtis et al. |
| 3,730,295 A * | 5/1973 | Deese ........................ 182/163 |
| 3,814,416 A * | 6/1974 | Munger et al. ............... 482/36 |
| 3,820,190 A * | 6/1974 | Moeller ...................... 16/35 R |
| 3,861,499 A * | 1/1975 | Follett, Jr. .................. 182/163 |
| 3,912,138 A * | 10/1975 | Pava .......................... 224/154 |
| 4,082,162 A * | 4/1978 | Diez .......................... 182/166 |
| 4,628,561 A | 12/1986 | Kushniryk |
| 4,761,847 A * | 8/1988 | Savage et al. ............... 14/69.5 |
| 4,773,503 A * | 9/1988 | Purkapile ..................... 182/22 |
| 4,864,673 A | 9/1989 | Adaway et al. |
| 4,923,360 A | 5/1990 | Beauchemin |
| 4,934,485 A * | 6/1990 | Purkapile ..................... 182/20 |
| 5,137,114 A | 8/1992 | Yde et al. |
| 5,538,308 A | 7/1996 | Floe |
| 5,944,141 A * | 8/1999 | Kochan et al. ............. 182/163 |
| 5,992,566 A * | 11/1999 | Yeh ........................... 182/163 |
| 6,099,233 A | 8/2000 | Craik |
| 6,119,811 A * | 9/2000 | Tsung-Ping ................. 182/164 |
| 6,135,532 A * | 10/2000 | Martin ........................ 296/61 |
| 6,318,498 B1 * | 11/2001 | Warner ....................... 182/164 |
| 6,457,559 B1 * | 10/2002 | Schlueter et al. ........... 182/159 |
| 6,527,326 B1 * | 3/2003 | Henderson ................... 296/61 |
| 6,536,558 B1 * | 3/2003 | Price .......................... 182/162 |

* cited by examiner

Primary Examiner—Thomas B. Will
Assistant Examiner—Alexandra Pechhold
(74) Attorney, Agent, or Firm—Bennett Jones LLP

(57) ABSTRACT

A collapsible loading ramp affixable to a raised surface in a non-permanent manner extending from the raised surface to the ground. The ramp is foldable by way of a hinge connecting the first ramp section to the lower ramp section. Rung units attach to the first and second ramp sections via posts and can be unattached to facilitate compact storage of the ramp pieces individually or in a compact box-like formation.

19 Claims, 8 Drawing Sheets

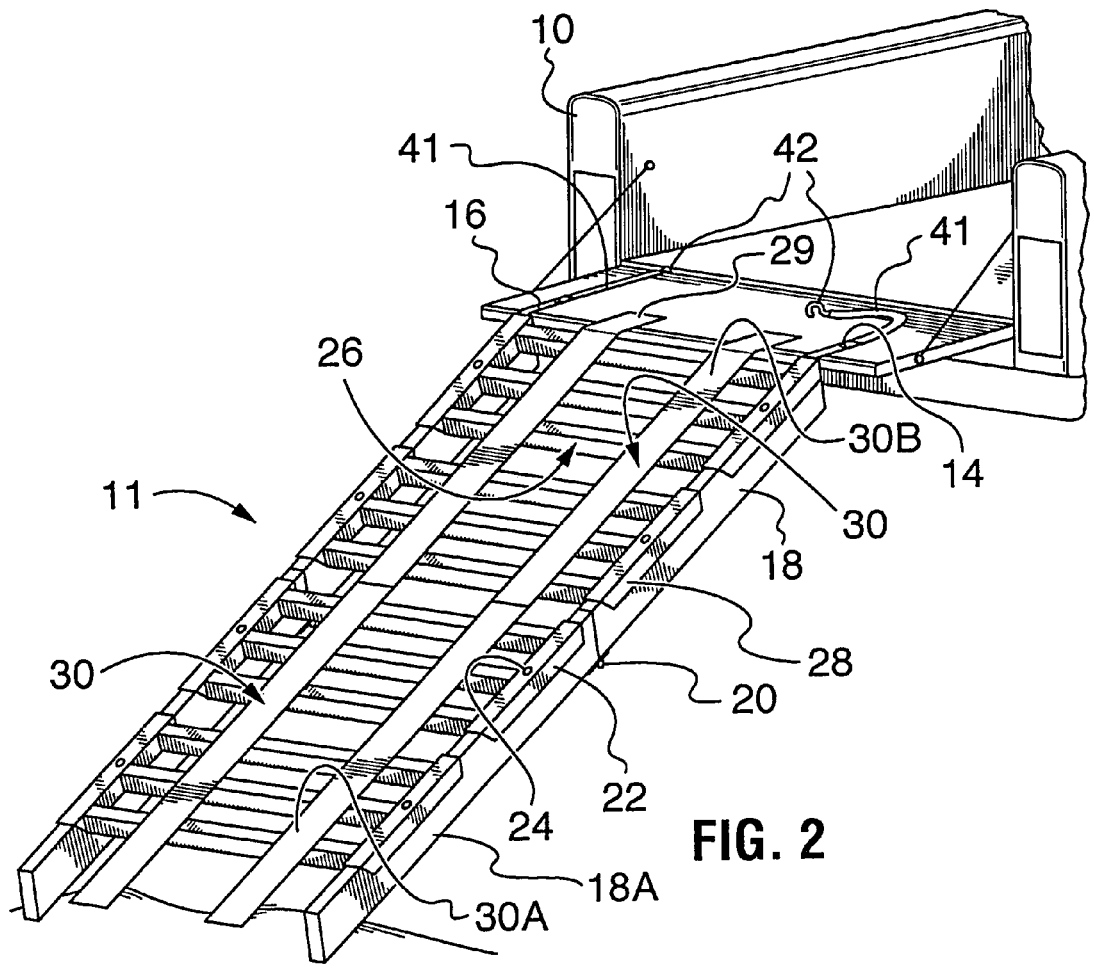
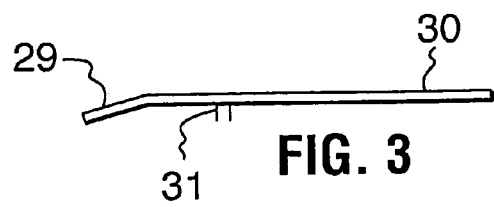
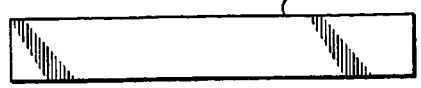
FIG. 2
FIG. 3
FIG. 4

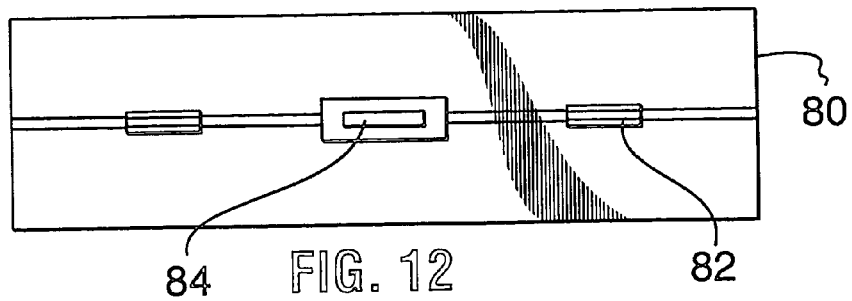
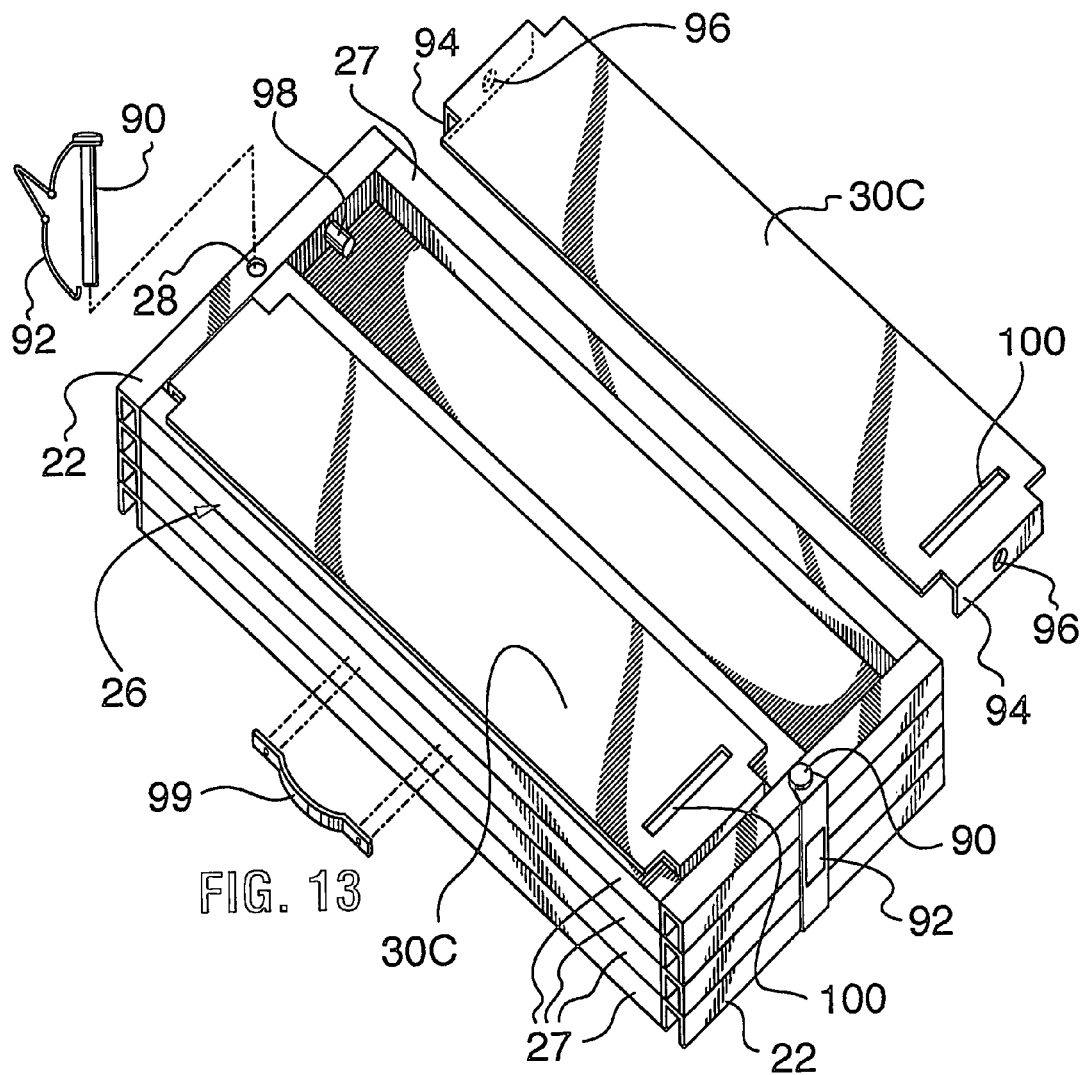

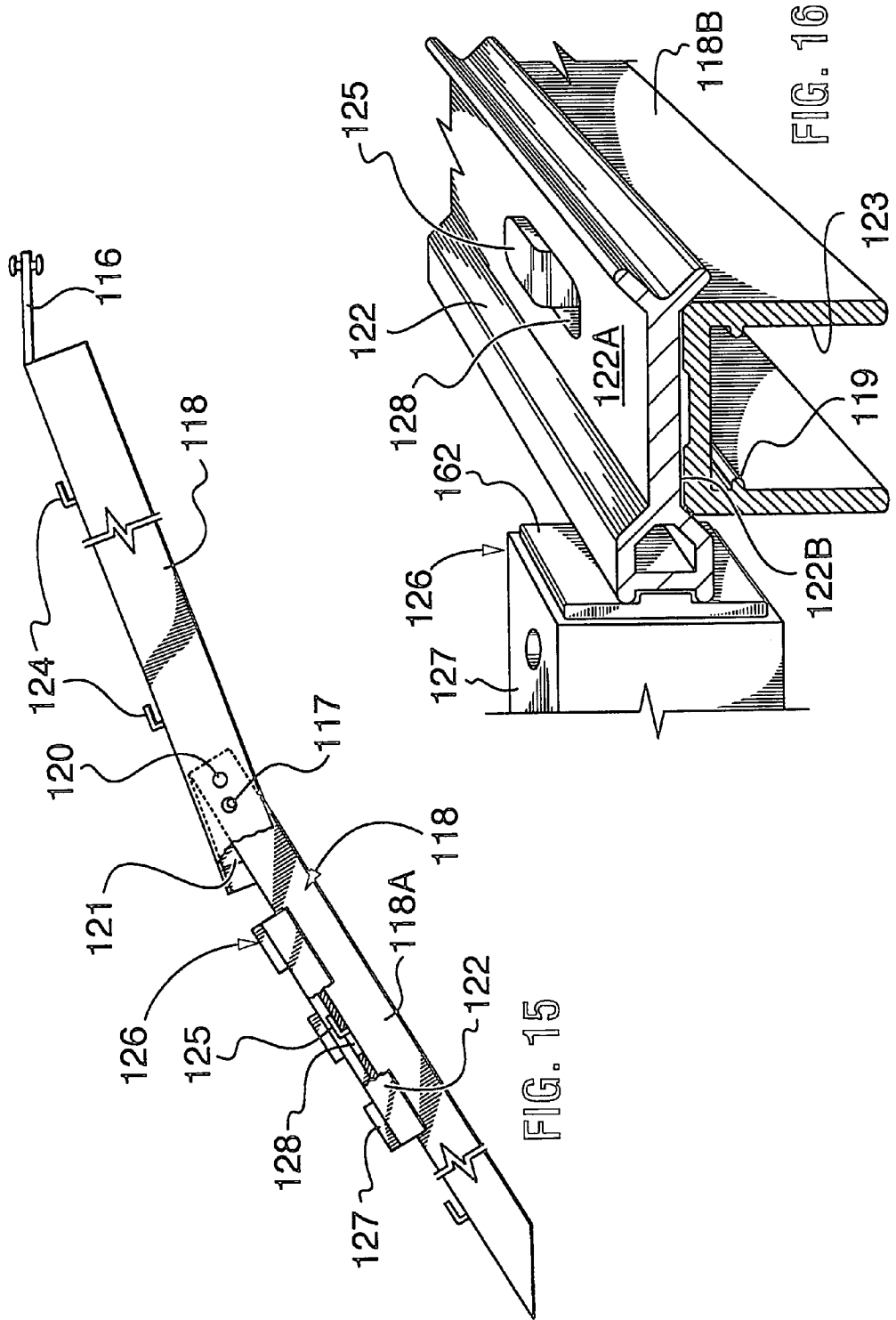

COLLAPSIBLE LOADING RAMP

FIELD OF THE INVENTION

This invention relates to a collapsible loading ramp suitable for gaining access to raised surfaces such as the bed of a pick-up truck or a raised ledge.

BACKGROUND

Collapsible ramps provide a dual benefit. First, they provide a means of bridging the gap between a horizontal raised surface and the ground so that an object or vehicle can be moved along said ramp and be loaded on to the raised surface. Second, they can be folded or slideably compacted into themselves so as to allow for easy storage. The prior art includes several collapsible ramps that fixedly attach to a raised surface, most commonly the tailgate of a truck.

Examples of prior art collapsible loading ramps are shown in Floe U.S. Pat. No. 5,538,308, Curtis U.S. Pat. No. 3,713,553 and Adaway U.S. Pat. No. 4,864,673.

Floe discloses a portable ramp structure constructed by a plurality of pairs of support members having longitudinal channels for mounting a predetermined number of cross members therebetween. Retention chains with associated hooks removably attach the ramp structure to a transport vehicle.

Curtis teaches a loading ramp that secures to a vertically swingable truck tail gate by mounting brackets. The ramp includes two sections hinged together to allow the ramp to fold so it can be stored in a compact form against the tailgate.

Adaway discloses a collapsible ramp comprising an attachment frame, a foldable support structure mounted to the attachment frame by pivotable hinges and a telescoping deck structure of interconnected, essentially rectangular plates. The foldable support structure has longitudinal support members with foldable joints intermediate along the lengths of the members, and these members are pivotally connected to the hinge. The support members fold back on themselves to reduce the ramp to a collapsed state for storage purposes.

SUMMARY OF THE INVENTION

The present invention provides a collapsible loading ramp which can be unassembled into pieces that can be stored conveniently. In its extended form, the ramp is removably attachable to a raised horizontal surface to provide access to the raised surface.

The ramp is a collapsible folding ramp that includes two longitudinal support rails that are fixable to the edge of a raised horizontal surface against which the ramp is to be supported. The ramp further includes a plurality of support cross members that attach between the longitudinal support rails. In particular, the side rails include plurality of posts that extend upwardly therefrom and the surface panels include apertures at their side edges that engage over the posts. The panels and side rails may have several embodiments. Preferably, the panels include channels along their edges that overlie the side rails to distribute weight to the longitudinal support rails. The panel dimensions are such that they are easy to store when stacked one upon the other but are large enough to minimize the number of panels that must be mounted on the rails.

The panels can be formed as rungs or alternately can have a plate surface. In one embodiment, the panels include rungs, as shown, but small plate members engage over the rungs.

BRIEF DESCRIPTION OF THE DRAWINGS

FIG. 2 shows the collapsible loading ramp of FIG. 1 in its extended position with perpendicular panels placed over the rungs and spaced a distance suitable to support the wheels of a vehicle to be driven up the loading ramp.

FIG. 3 shows a front elevation view of a panel member.

FIG. 4 shows a top plan view of a panel member.

FIG. 12 shows a front elevation view of a carrying case for the disassembled ramp.

FIG. 13 shows a perspective view of the ramp pieces assembled as a box with a carrying handle.

FIG. 14 shows a front elevation view of a plate member of FIG. 13.

FIG. 15 shows a side elevation view of another ramp according to the present invention in its extended position, partially assembled and partially cut away.

FIG. 16 shows a perspective view, partly in section, of a cross member useful in the embodiment of FIG. 15 on a rail.

DETAILED DESCRIPTION

Figure 1:
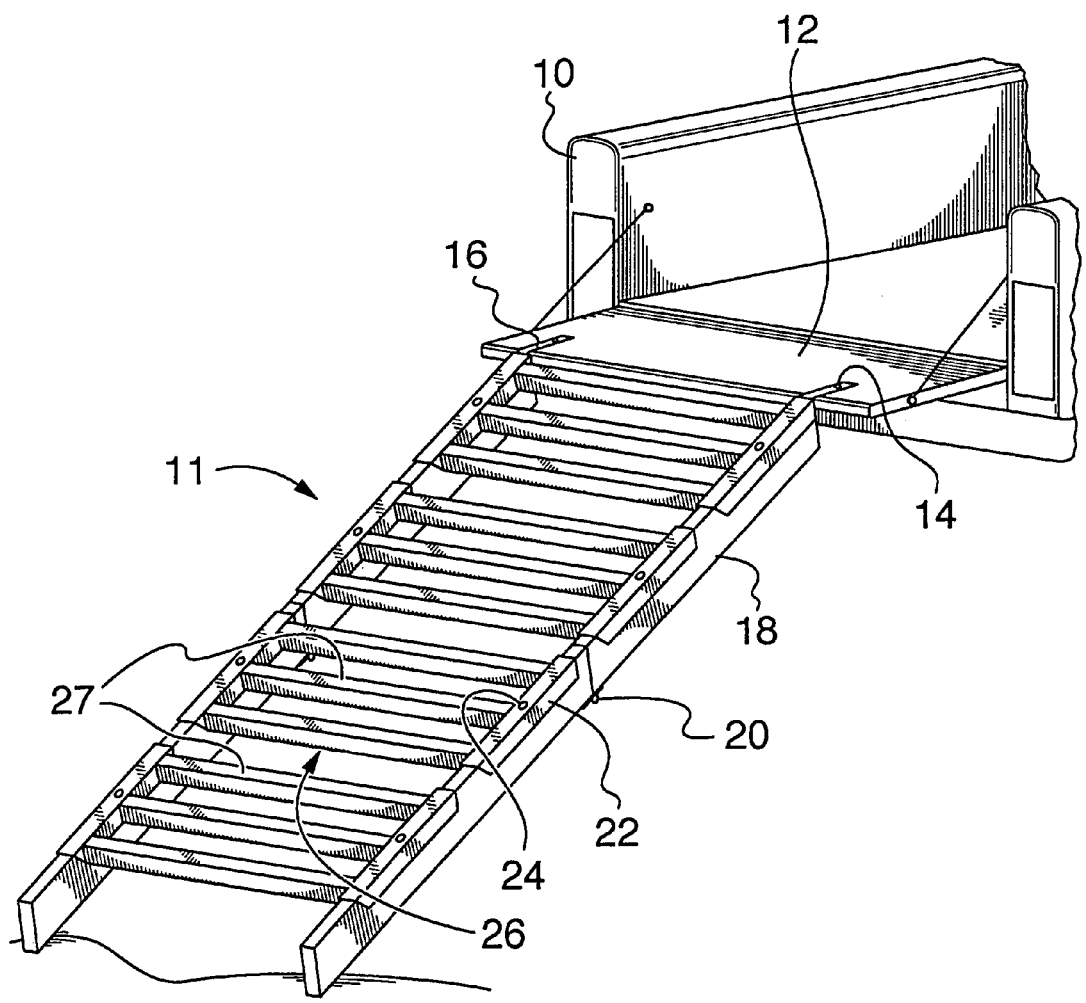
FIG. 1 is one embodiment of the collapsible loading ramp shown mounted to the gate of a pickup truck.

Referring now to FIG. 1 there is shown a collapsible loading ramp 11 mounted to the tailgate 12 of a pickup truck 10. The ramp facilitates access to the bed of the truck via the tailgate. While a tailgate is shown, it is to be understood that the ramp can be used to provide access to any raised surface such as a porch, loading dock, etc.

The collapsible ramp 11 includes a pair of foldable longitudinal support rails 18 and cross members 26 each including rungs 27 attached in groups and extending between a pair of side supports 22. Cross-members 26 extend between the foldable longitudinal support rails and provide a surface for supporting movement over the ramp. Cross members 26 are mounted on support rails 18, such that they generally extend at right angles to the long axis of the ramp. The ramp can be mounted onto the tailgate or raised surface in any desired manner. However, preferably any mounting arrangement engages the ramp to the tailgate 12 during use to prevent the ramp from working loose. In the illustrated embodiment, a mounting mechanism 14 is used which is attached at the end of each support rail 18.

While the embodiment of FIG. 1 shows the cross members formed as rungs, other cross members can be used such as solid plates or a combination thereof. For example, FIG. 2 shows the collapsible loading ramp 11 with plate members 30 fit over the rungs. Plate members 30 hook over the cross members 26 in a fixed but removable manner so as to be secure during use but easily adjustable. In the illustrated embodiment, the plate members 30 need only be slid along a rung in order to be moved to match the spacing of the tires of any vehicle that may be loaded via the ramp 11. The plate members 30 also distribute the weight of an object being loaded evenly over a length of the rung surface. Each plate member 30 can be formed of a single length or multiple separate plate pieces, for example, an upper piece 30B and a lower piece 30A, as shown. The plate members each include a means for securing them to the cross members such as a hook, a clamp, a post or, as shown, ribs 31 forming a channel engageable over a rung. Plate members 30 are bent so as to be angled at one end 29. The bent end of the plate member 29 can be upwardly positioned so as to connect with the tailgate 12 and provide an angled leadway to the tailgate 12.

Figure 5:
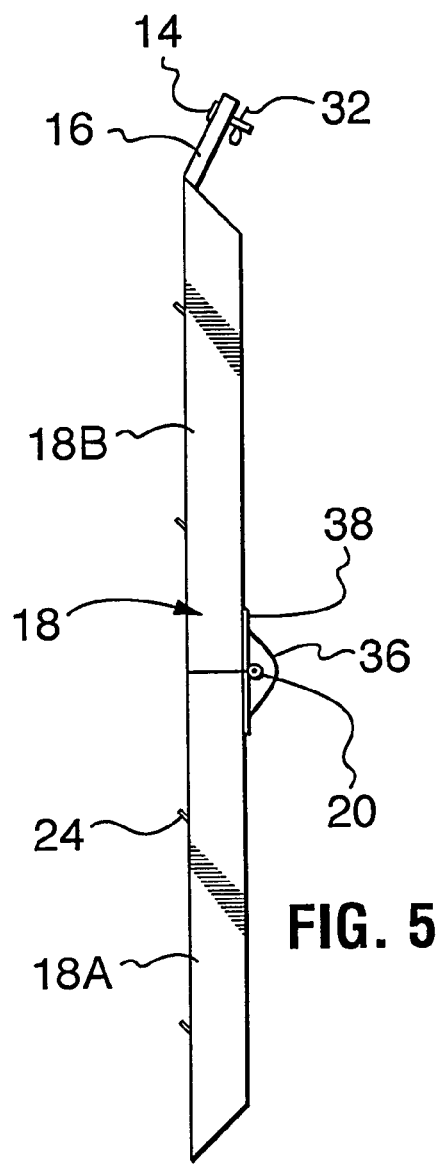
FIG. 5 shows a side view of a side rail in an extended position.
Figure 6:
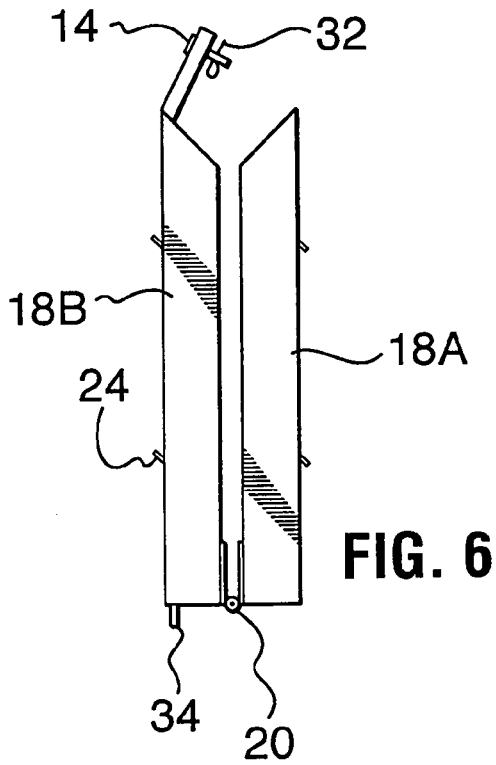
FIG. 6 shows a side view of a side rail in a folded position.

FIGS. 5 and 6 show a longitudinal support rail 18 in greater detail. Longitudinal support rail 18 is formed of lower 18A and upper 18B portions foldably joined by a hinge 20, which permits the rail to be folded (FIG. 6) and thereby facilitates storage. The hinge 20 is, in the illustrated embodiment, attached to the longitudinal support rail 18 by a bolted plate 38. However, other hinge arrangements can be used as desired. A safety cable 36 is secured, as by use of rivets, to the bolted plate 38 of the hinge 20. The safety cable 36 strengthens the hinged connection 20 and provides a secure connection between the upper 18B and lower 18A portions of the longitudinal support rail 18 so that the portions of the longitudinal support 18 will remain connected even in the event that the hinge breaks. A hinge secure extension 34 extends from the longitudinal support rail upper portion 18 and fits into an aperture in the longitudinal support rail lower portion 18A when said rail is extended. Extension 34 serves to maintain the portions 18A and 18B in proper alignment and to distribute the stress at the hinge over a greater area.

Releasable mounting mechanism 14 includes a mounting strap 16 extending from the end of each longitudinal support rail 18. The mounting mechanism 14, as shown, can also include a pin 14 insertable through an aperture 16a in each mounting strap 16. The releasable mounting mechanism operates by securing to a raised surface which includes apertures for accepting pins 14. In particular, the releasable mounting mechanism is operated by placing mounting straps 16 onto a raised surface, such as a tailgate or mounting ledge, and aligning apertures 16a with apertures in the raised surface. Pin 14 is then fit through the aperture 16a in the mounting strap 16 and through the aperture in the tailgate or mounting ledge. Once inserted entirely through the aligned apertures a removable cotter pin 32 already fit through an aperture in the pin 14 acts to hold the pin 14 in place. Various other mounting means can also be utilized to mount the ramp onto a tailgate or mounting edge, such as adhering a non-slip material to the base of the mounting strap 16 so that when it is placed on the tailgate 12 the ramp is supported.

Figure 8:
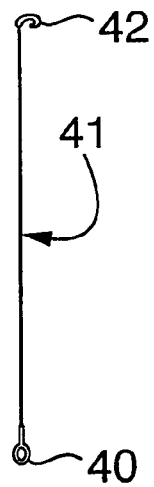
FIG. 8 shows an elevation view of the alternate means of fixing the ramp to the raised horizontal surface by way of straps.

FIG. 2 shows another type of mounting means employing a hooked flexible strap 41 (FIG. 8), which may be attached to the mounting strap 16 by fitting the pin 14 through both an eye 40 in the hooked strap 40 and the aperture 16a in the mounting strap and affixing cotter pin 32 through pin 14. The pin 14 should be inserted through the aperture 16a in the mounting strap 16 upside down so that the end of the pin and the cotter pin point upwards and neither can damage the surface of the tailgate 12. Once attached to mounting strap 16, hooked strap 41 can be extended to secure the ramp. In particular, hooked end 42 of the strap can be engaged over an edge or around a support member and hooked onto the strap to support the ramp. In FIG. 2, one strap 41 is shown with its hooked end 42 engaged over an edge of the tailgate and the other strap is attached to mounting strap 16 but not yet engaged over an anchor point.

Figure 7:
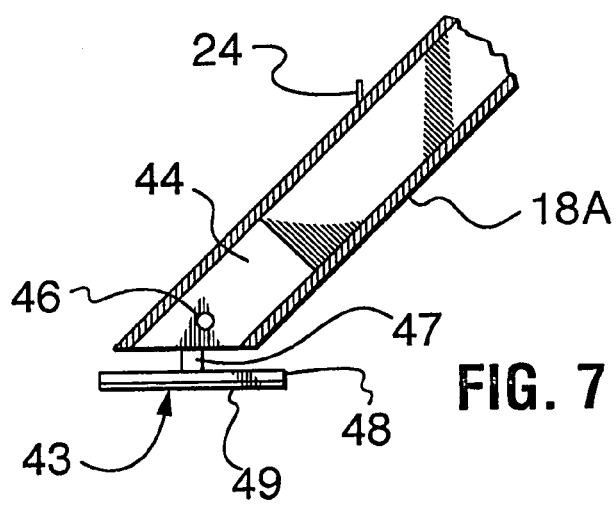
FIG. 7 shows a side elevation view of a side rail with a foot attachment at the lower end thereof, with the side rail shown in section.

The support rails 18 can be set at their lower end directly on the lower surface. Alternately, as shown in FIG. 7, a foot attachment 43 can be mounted to the lower portion of the longitudinal support rail 18. A flat foot side panel 44 is affixed parallel to the longitudinal support rail lower portion 18b via a pin 46 which fits through an aperture in the foot side panel and an alignable aperture in the longitudinal support rail 18A. A perpendicular attachment extends from the foot side panel 44 to the foot base 48. A non-slip material 49 may be attached to the underside of the foot base 48.

For attachment of the cross members 26, longitudinal support rails include a plurality of posts 24 fixedly attached to their upper surfaces. Posts 24 are sized to fit though apertures formed on the cross members 26. Preferably, the posts 24 are sized to extend upwardly through apertures 28 but are short enough such that they do not interfere with passage over the ramp. Posts 24 are preferably angled towards to the top of the ramp so that the cross members 26, can engage them and do not easily become disengaged from the rails when engaged over the posts 24.

Figure 9A:
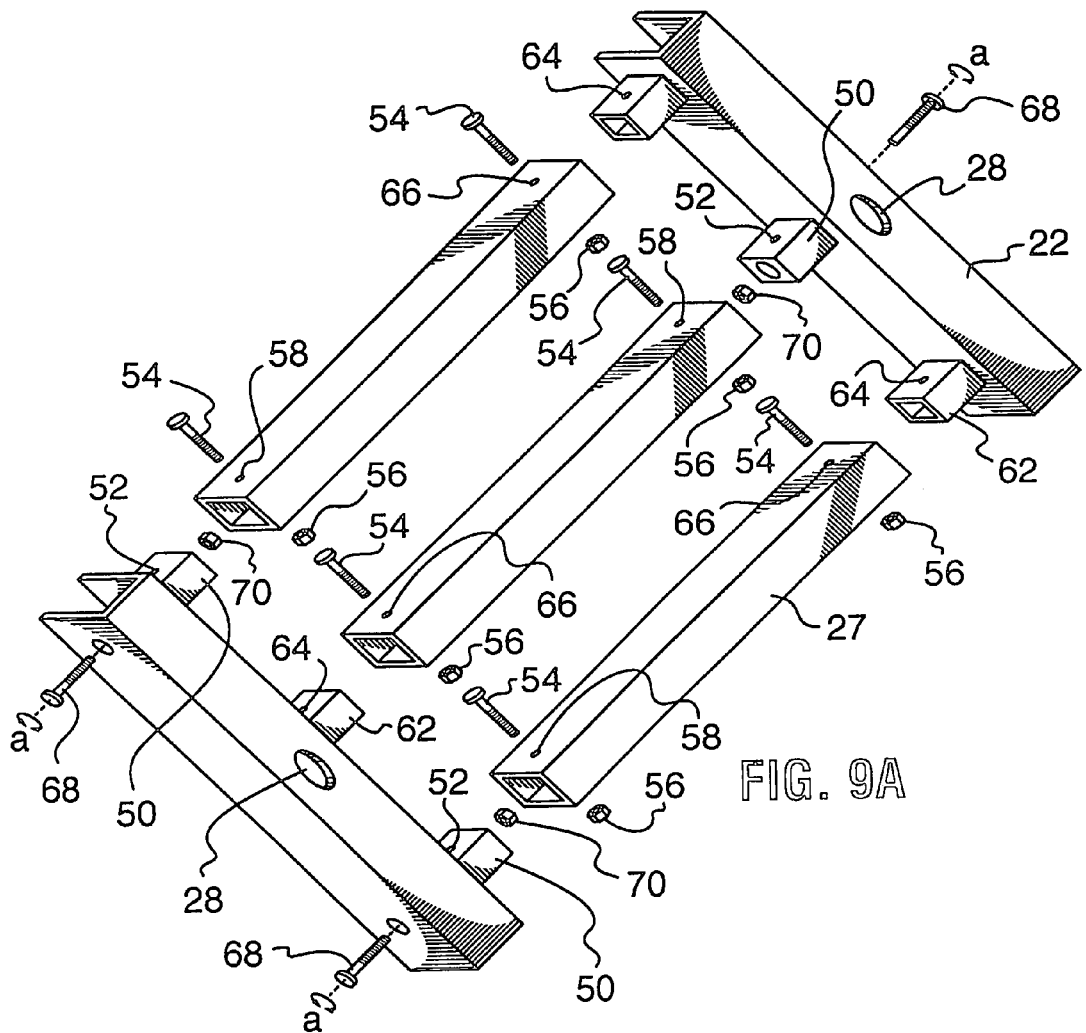
FIG. 9A shows an exploded view of a cross member.
Figure 9B:
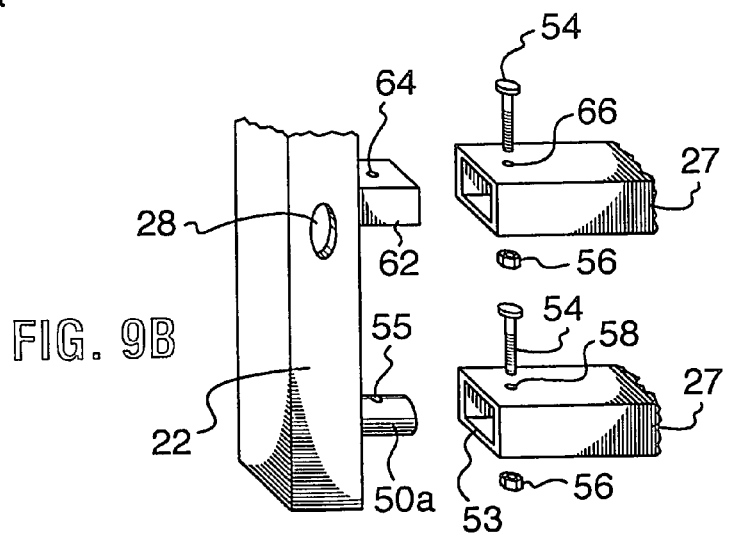
FIG. 9B shows an exploded view of another connection for a rung and side support.
Figure 10:
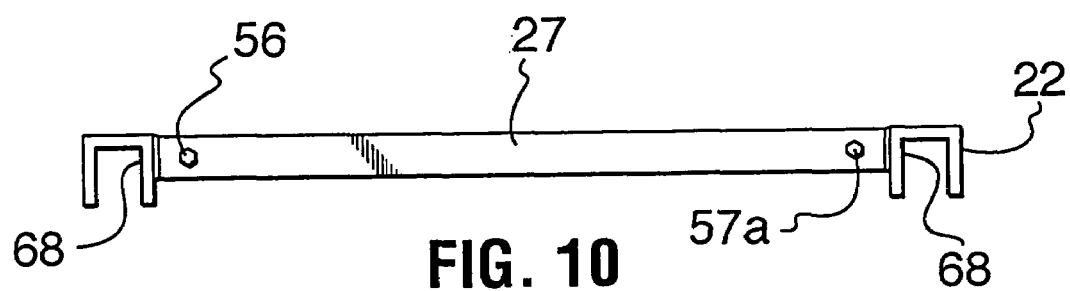
FIG. 10 shows a front elevation view of an assembled rung cross member.
Figure 11:
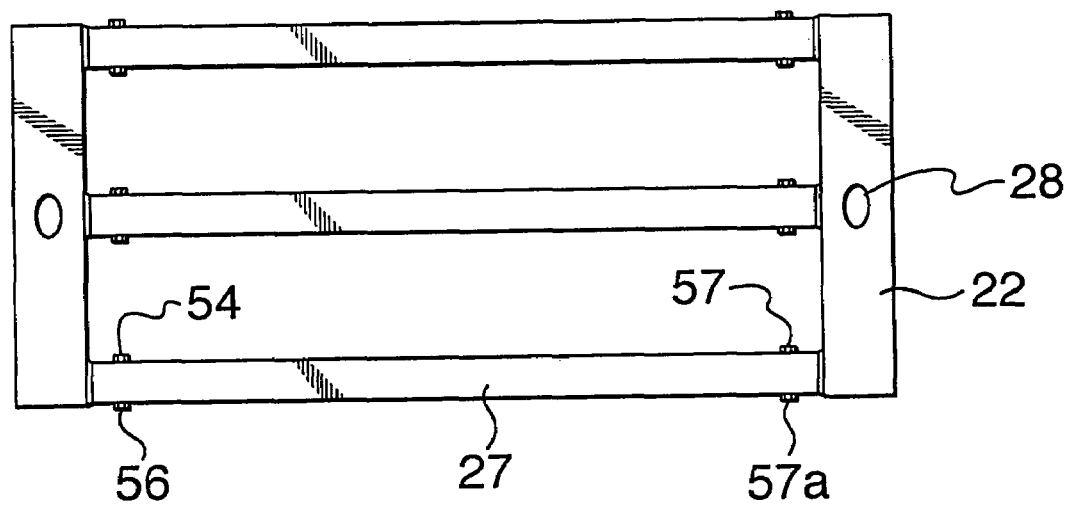
FIG. 11 shows a top plan view of an assembled rung cross member.

One embodiment of a cross member 26 is shown in exploded configuration in FIG. 9 and in assembled form in FIGS. 10 and 11. Cross member 26 includes a pair of side supports 22 and three rungs 27 extending there between. It is to be understood that, while three rungs are shown, any number of rungs can be used on each cross member. Side supports 22 are formed as channels sized to fit over longitudinal support rails 18. Each side support 22 includes a form, such as an aperture 28, as shown, for securing over a post 24 on the longitudinal support rail over which it is selected to fit. As will be appreciated, the positioning, size, and number of forms on a side support 22 will be determined by the placement, spacing and size of the posts 24 on the longitudinal support rails with which the cross members are to be used.

The rungs are attached to the side supports such that they can withstand application of a desired weight, such as a small tractor, without failing. Preferably, the rungs are constructed to permit a degree of flex or pivot movement between the rungs and the side supports such that they can withstand some offset between longitudinal side rails 18 while the side supports remain firmly in engagement with the posts on the side rails.

In the illustrated embodiment, to assemble the cross members rungs 27 having hollow interiors can be used. A fixed post 62 and a post providing for pivotal attachment of the rung 50, are attached to the each inner longitudinal edge of a side support 22. Fixed posts 62 are substantially rigidly attached to side supports 22, as by a means such as welding and thereby cause the rungs to be rigidly attached to the side supports when the rungs are secured into the fixed posts. Posts 50 can be attached to the side supports 22 by a variety of means. FIG. 9A shows rectangular posts 50 that are attached to a panel via a bolt 68 and secured with a nut 70, such that posts 50 can pivot about the long axis of the bolt. As such, pivotal movement is permitted, as indicated by arrows a, between the rungs and the side supports, when the rungs are mounted onto the posts. FIG. 9B shows an alternative means of achieving pivotal connections between the rungs and the side supports wherein round posts 50a are fixedly attached, by a means such as welding, to the side supports 22.

Fixed posts 62 and posts 50 are sized so as to fit within the hollow interior of a rung 27. In assembly, a single rung 27 is secured with a fixed post 62 at one end and a post 50 at the other end. Fixed posts 62 and posts 50 will be positioned so as to alternate along the side support 22.

A method of attaching the rungs to the fixed and posts is shown in FIG. 9A by which an aperture 64 and 52 extends through the upper and lower faces of the posts on one end of the rung and an aperture 66 and 58 extends through the upper and lower faces of the rung 27 near the opposite end of the rung 27. When the rung 27 and the posts are fit together the apertures 64 and 52 in the posts and the rung line up to form a single hole into which a bolt 54 or 57 can be inserted and locked therein by a nut 56 or 57a, so as to attach the cross member 60 to the post.

Round posts 50a as shown in FIG. 9B are fitted into the open end of the rung 27. Aperture 58 in the rung 27 is aligned with a slot 55 in the post 50a so that bolt 54 is inserted into the aperture and through the slot 55 and locked by a nut 56 so as to attach the cross member to the post. Slot 55 therefore permits sliding movement of the bolt and therefore, pivotal movement of the rung relative to the side support, without a simpler arrangement than that shown in FIG. 9A.

Of course, fasteners, such as rivets or pins, other than bolts 54, 57 can be used, as desired.

The ramp is foldable to facilitate storage thereof. FIGS. 12 to 14 show embodiments of means for storing the ramp when it is not in use. In particular, FIG. 12 shows a carrying case 80 in which the individual unassembled pieces of the ramp, including rails 18 and cross members 26, can be packed. The clasps 82 on the carrying case 80 keep the case closed and the handle 84 allows for easy transportation of the stored ramp. Carrying case 80 is sized to accommodate all of the pieces of the ramp, with the rails folded about hinge 20 and the cross members 26 removed from posts 24 and stacked one upon the other.

FIG. 13 shows, in partial exploded configuration, a stacked assembly of ramp pieces, including support rails 18, cross members 26 and panels 30 formed into a box-shaped structure for transport. In this assembly, cross members 26 are stacked one upon the other with side supports 22 aligned within the stack. Support rails 18 folded around the hinge fit between the cross members in the stack. Pins 90 are inserted through aligned apertures 28 in the stacked cross members. A lock clamp 92, or other locking means such as a spring biased detent, is provided in association with each pin 90 to releasably lock the pins through the apertures. In this embodiment, plate members 30C are placed on the top and the bottom of the stacked cross members 26 to form a solid outer face for the box structure. Plate members 30C are formed and sized to fit between side supports 22 with flanged ends 94 fitting down between adjacent rungs 27. Flanged ends 94 each include an opening 96, which can be engaged over pin 98 to secure the plates in place. A handle piece 99 can be attached to a cross member to allow the box structure to be easily transported.

In this embodiment, to facilitate use of the plate members, slots 100 are formed to accommodate flanged end 94 of the adjacent plate, when the plates are mounted on the assembled ramp.

The individual pieces of the ramp when unassembled can be stored in one of the manners described or in other ways such as each piece being separate from the other pieces.

One person can easily collapse and extend the ramp making it possible to load or unload a machine quickly and efficiently.

Figure 17:
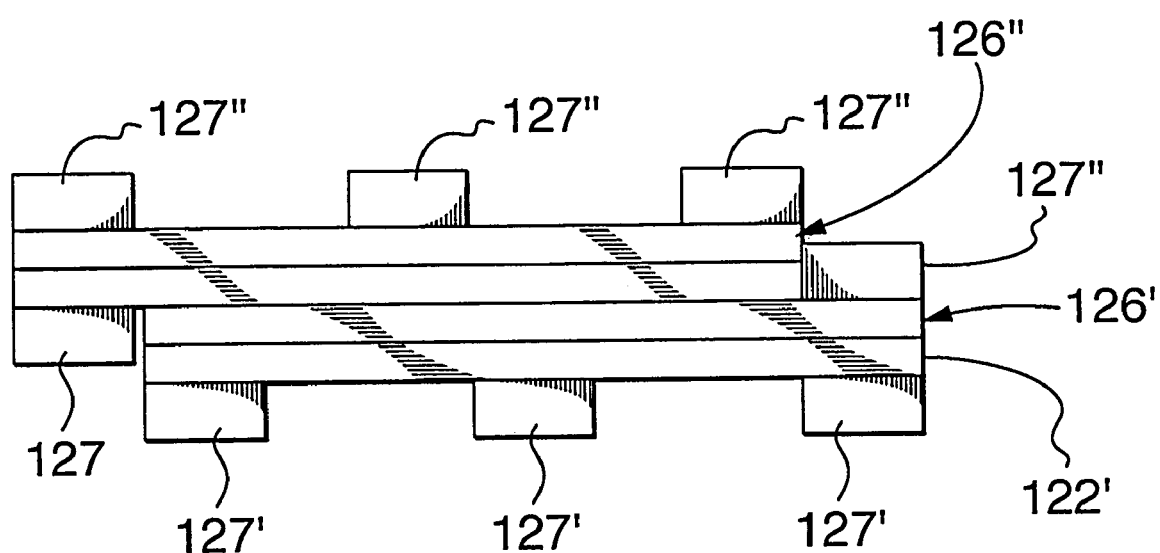
FIG. 17 shows a plurality of cross members of FIG. 15 in a stacked configuration.

Referring to FIGS. 15 to 17, there is shown another ramp embodiment according to the present invention. The ramp includes side rails 118 (only one can be seen as one is disposed behind the other) and cross members 126 (only one is shown already mounted on the rails).

The side rails are formed as two parts including a first member 118A and a channel member 118B connected and foldable at a hinge formed by hinge pin 120. The hinge includes a shock absorbing member which can be, for example, a rubber insert 121, as shown or a spring that acts against compression. The shock absorbing member acts between the rail parts to bias them into a slightly folded configuration. When a load is applied to the ramp, the shock absorbers will ease rotation about the hinge and when sufficient load is applied to overcome the tension in the shock absorber, the rail parts will pivot to further straighten and extend the rail. The shock absorber provides the side rails with a slight arch, which facilitates loading of mower decks and protects the hinge components to reduce fatigue and sagging at the hinge.

A safety pin or detent 117 arrangement can be provided to lock the side rails into an extended position. Any such arrangement should be selected to permit limited movement about the hinge pin, as will be needed to gain the benefit of the shock absorber.

The formation of the rails as a first member and a channel member permits that when the parts are folded first member 118A can fit into the hollow inner space 123 of the channel member. This reduces the overall folded size of the rails over a folding rail arrangement of FIG. 6. First member 118A can be formed in any way, such as by use of a hollow tubular, a solid rod or a channel.

First member 118A and channel member 118B of the side rails can conveniently be formed by extrusion, for example of aluminum. As such, returns 119 can be formed in the channel member to facilitate securing mounting strap 116.

Rails 118 in this embodiment include posts 124 for engaging cross members 126. Posts 124 each include an angled head 125 under which the cross member to be engaged thereon can slid to be locked against lifting thereoff, as will be described in greater detail hereinbelow.

Cross members 126 are formed to engage over posts 124 and to extend between side rails 118. Cross members 126 each include side supports 122 and rungs 127 extending therebetween. In this illustrated embodiment, side supports 122 are formed to be reversibly mountable with either first facing side 122A or second facing side 122B fitting over side rails. In particular, the side supports are formed with longitudinal recesses between raised edges 129 on both sides 122A and 122B to fit over the side rails. This facilitates mounting of the cross members on the rails, avoiding a situation wherein the cross members are incorrectly mounted with their wrong side up on the rails.

Side supports 122 include slots 128 sized to permit passage therethrough of the angled portion 125. However, the side supports are of a thickness to slide under the angled portions to be locked against lifting off the posts.

Rungs 127 are secured between side supports 122 by any durable means such as by welding, bolting or through the use of connectors 162 therebetween which, as discussed in previous embodiments, can be formed to permit some flex between the rungs and the side supports.

Note that the side supports have a height that permits compact stacking for storage. In particular, the height of the side members is less than, and preferably about half, that of the rails. With reference to FIG. 17, this permits two cross members 126', 126" to be stacked with their side supports 122', 122", respectively, resting directly one upon the other and their rungs 136', 136" offset between adjacent cross members in the stack.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A collapsible loading ramp comprising:
   at least a first longitudinal support structure and a second longitudinal support structure, each of the first longitudinal support structure and the second longitudinal support structure having an upper surface and each including a raised post extending from the upper surface;
   a cross-member including a pair of side supports, a plurality of rungs extending between the pair of side supports, a first aperture formed to fit over the raised post on the first longitudinal support structure and a second aperture spaced from the first aperture and formed to fit over the raised post on the second longitudinal support structure, the cross member thereby being formed to attach between the first longitudinal support structure and the second longitudinal support structure by removably engaging over the posts to bear against the upper surfaces of the first longitudinal support structure and the second longitudinal support structure; and
   the first longitudinal support structure, the second longitudinal support structure and the cross member each being separable from the others for disassembly and collapsing of the ramp.

2. The collapsible loading ramp as claimed in claim 1 wherein the side supports include a first facing side and an opposite facing side and either the first facing side or the opposite facing side can be mounted against the longitudinal support structures.

3. The collapsible loading ramp as claimed in claim 1 wherein at least one connection between a rung and a side support permits flex therebetween.

4. The collapsible loading ramp as claimed in claim 1 wherein the first longitudinal support structure is foldable at a hinge.

5. The collapsible loading ramp as claimed in claim 4 including a safety cable connected about the hinge such that the safety cable is pulled tight about the hinge when said longitudinal support structure is extended to prevent the hinge from overrotating when a load is applied to the ramp.

6. The collapsible loading ramp as claimed in claim 4 further comprising a shock absorber at the hinge.

7. The collapsible loading ramp as claimed in claim 1, wherein the posts each include an angled head under which the cross members can be slid to be locked against lifting vertically off the post.

8. The collapsible loading ramp as claimed in claim 1 further comprising a second cross member and the cross member and the second cross member are formed to stack together when in a stored configuration.

9. The collapsible loading ramp as claimed in claim 1 wherein the raised posts are mounted on the first longitudinal support structure and the second longitudinal support structure.

10. The collapsible loading ramp as claimed in claim 9 wherein, in a collapsed position, the raised posts remain mounted on the first longitudinal support structure and the second longitudinal support structure and the first and second apertures are removed from over the raised posts.

11. The collapsible loading ramp as claimed in claim 1 wherein the side supports each include a channel extending substantially perpendicularly to the plurality of rungs.

12. The collapsible loading ramp as claimed in claim 11 wherein the channels are each formed to fit over one of the upper surface of the first longitudinal support structure and upper surface of the second longitudinal support structure.

13. The collapsible loading ramp as claimed in claim 1 wherein the first aperture is formed through a first of the pair of side supports and the second aperture is formed through a second of the pair of side supports.

14. The collapsible loading ramp as claimed in claim 1 wherein at least one rung of the plurality of rungs defines a longitudinal axis and the at least one rung is attached to one of the pair of side supports by a pivotal connection that permits pivotal movement therebetween about the longitudinal axis.

15. The collapsible loading ramp as claimed in claim 1 wherein the first longitudinal support structure comprises a first part, a second part, a hinge between the first part and the second part to permit the first longitudinal support structure to be folded about the hinge and a shock absorber positioned between and in contact with the first part and the second part to bias them into a slightly folded configuration.

16. The collapsible loading ramp as claimed in 7 wherein the first aperture is sized to fit ova both the raised post and its angled head.

17. A collapsible loading ramp comprising:
   at least a first longitudinal support structure and a second longitudinal support structure, each of the first longitudinal support structure and the second longitudinal support structure having an upper surface and each including a raised post extending from the upper surface and the first longitudinal support structure including a first part, a second part and a hinge acting between the first part and the second part to permit the first longitudinal support structure to be folded about the hinge and a shock absorber positioned between and in contact with the first part and the second part to bias them into a slightly folded configuration;
   a cross-member including a first aperture formed to fit over the raised post on the first longitudinal support structure and a second aperture spaced from the first aperture and formed to fit over the raised post on the second longitudinal support structure, the cross member thereby being formed to attach between the first longitudinal support structure and the second longitudinal support structure by removably engaging over the posts to bear against the upper surfaces of the first longitudinal support structure and the second longitudinal support structure; and
   the first longitudinal support structure, the second longitudinal support structure and the cross member each being separable from the others for disassembly and collapsing of the ramp.

18. A collapsible loading ramp comprising:

at least a first longitudinal support structure and a second longitudinal support structure, each of the first longitudinal support structure and the second longitudinal support structure having an upper surface and each including a raised post extending from the upper surface, the raised posts each including an angled head;

a cross-member including a first aperture formed to fit over the raised post on the first longitudinal support structure and capable of sliding under the raised head to be locked against lifting vertically off the raised post and a second aperture spaced from the first aperture and formed to fit over the raised post on the second longitudinal support structure and capable of sliding under the raised head to be locked against lifting vertically off the raised post, the cross member thereby being formed to attach between the first longitudinal support structure and the second longitudinal support structure by removably engaging over the posts to bear against the upper surfaces of the first longitudinal support structure and the second longitudinal support structure; and the first longitudinal support structure, the second longitudinal support structure and the cross member each being separable from the others for disassembly and collapsing of the ramp.

19. The collapsible loading ramp as claimed in 18 wherein the first aperture is sized to fit over both the raised post and its angled head.

* * * * *